US009571978B1

(12) United States Patent
Ananth

(10) Patent No.: US 9,571,978 B1
(45) Date of Patent: Feb. 14, 2017

(54) USER EQUIPMENT POSITIONING UTILIZING MOTION OF HIGH ALTITUDE PLATFORM

(71) Applicant: Google Inc., Mountain View, CA (US)

(72) Inventor: Sharath Ananth, Cupertino, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/071,785

(22) Filed: Mar. 16, 2016

(51) Int. Cl.
*H04B 7/185* (2006.01)
*H04W 4/02* (2009.01)
*H04W 24/10* (2009.01)
*H04M 1/725* (2006.01)

(52) U.S. Cl.
CPC ............. *H04W 4/023* (2013.01); *H04W 24/10* (2013.01); *H04B 7/18513* (2013.01); *H04M 1/72519* (2013.01)

(58) Field of Classification Search
CPC .... H04W 64/00; H04W 4/02; H04M 1/72519; H04B 7/18513; G01S 5/12
USPC ... 455/456.1, 456.5, 550.1, 12.1; 342/357.21
See application file for complete search history.

(56) References Cited

U.S. PATENT DOCUMENTS

| 6,243,648 | B1 | 6/2001 | Kilfeather et al. | |
|---|---|---|---|---|
| 7,203,503 | B2 | 4/2007 | Cedervall et al. | |
| 8,334,807 | B2 * | 12/2012 | Gaal | G01S 19/25 342/357.73 |
| 9,386,414 | B1 * | 7/2016 | Mayor | H04W 4/02 |
| 2007/0021122 | A1 | 1/2007 | Lane et al. | |
| 2008/0274750 | A1 | 11/2008 | Carlson et al. | |
| 2009/0135060 | A1 * | 5/2009 | Lennen | G01S 19/22 342/357.31 |
| 2011/0092237 | A1 | 4/2011 | Kato et al. | |
| 2011/0210889 | A1 * | 9/2011 | Dai | G01S 19/235 342/357.29 |
| 2011/0287779 | A1 * | 11/2011 | Harper | G01S 19/03 455/456.1 |
| 2012/0231788 | A1 * | 9/2012 | Kaminski | H01Q 1/246 455/431 |
| 2013/0307723 | A1 * | 11/2013 | Garin | H04W 64/003 342/357.29 |

(Continued)

FOREIGN PATENT DOCUMENTS

WO WO-99/29130 6/1999

OTHER PUBLICATIONS

Cello Consortium. (2001). Cellular Location Technology, Cellular Network Optimization Based on Mobile Location. IST-2000-25382-CELLO).

(Continued)

*Primary Examiner* — Danh Le
(74) *Attorney, Agent, or Firm* — Foley & Lardner LLP; John D. Lanza

(57) ABSTRACT

The systems and methods of the disclosure relate to estimating the location of a remote device, e.g., a mobile phone or other user equipment ("UE"), that is in communication with equipment aboard a high altitude platform ("HAP"). Because the HAP is in motion, the location of the equipment aboard the HAP is not at a fixed location. While this breaks some forms of traditional UE location positioning techniques, it creates new information that can be used instead. Thus, when traditional GPS or ground-station based location services are unavailable, a remote device in communication with equipment aboard a HAP can still be positioned.

20 Claims, 9 Drawing Sheets

(56) References Cited

U.S. PATENT DOCUMENTS

| | | | |
|---|---|---|---|
| 2014/0111375 A1* | 4/2014 | Beauregard | G01S 13/82 |
| | | | 342/357.42 |
| 2014/0228057 A1 | 8/2014 | Uga et al. | |
| 2015/0338524 A1* | 11/2015 | Ben Moshe | G01S 19/50 |
| | | | 342/357.33 |
| 2016/0003948 A1* | 1/2016 | Loomis | G01S 19/43 |
| | | | 342/357.26 |

OTHER PUBLICATIONS

Lähdekorpi, Panu, et al. "Replacing terrestrial UMTS coverage by HAP in disaster scenarios." Proceedings of EW2010, European Wireless 2010, Apr. 12-15, 2010, Lucca, Italy (2010).

\* cited by examiner

USER EQUIPMENT POSITIONING UTILIZING MOTION OF HIGH ALTITUDE PLATFORM

BACKGROUND

Mobile communication equipment, e.g., cellular telephones, mobile modems, and the like, provide communication services to end-users by interacting with a communication network via a radio link. Depending on the protocol or standard used for the radio link, the mobile communication equipment may be referred to as a mobile device, mobile terminal, mobile station, or as user equipment ("UE"). For example, the standards for Global System for Mobile Communications ("GSM") usually refer to the mobile communication equipment as the "mobile station," whereas the standards for Universal Mobile Telecommunication System ("UMTS") usually refer to the mobile communication equipment as the "user equipment." This disclosure uses the term "user equipment" (or "UE" for short) to refer to all forms of mobile communication equipment, including devices traditionally referred to by the term "user equipment," as well as mobile communication equipment traditionally referred to by other terms.

It is useful to be able to estimate the location of a UE. For example, some jurisdictions require service providers to locate user equipment during an emergency ("E-911"). Many UE devices incorporate a Global Positioning Satellite ("GPS") receiver and can use GPS signals to pinpoint its location. However, GPS location data is not always available. For example, the satellite signals may be obstructed or the GPS receiver may be disabled, e.g., to conserve power. When a UE cannot report its location based on GPS, other methods are needed to estimate the UE's location. Estimating a location of a UE is known as "positioning." While precise positioning is desirable, e.g., using GPS, the ability to position a UE to within even a reasonably-sized geographic area can still be helpful, e.g., for locating a UE in an emergency.

User equipment interacts with the communication network via a radio link between the UE and a network access node that includes one or more antennas, transceivers, and computer controllers. The discrete elements of the network access node may include, for example, various antenna structures for omnidirectional or directed antennas, radio transceivers ("TRX"), a base transceiver station ("BTS," also called a "Node B," "Evolved Node B," or "eNodeB," depending on the implemented protocol or standard), amplifiers, controllers, and so forth. For simplicity, the network access node is referred to herein as a "base station" without limitation to any particular form or type of network access node.

If a UE is in communication with a particular base station, then the location of the UE is somewhere within the coverage area of the base station. In some settings, a network service provider will maintain multiple base stations covering a geographic area. When a UE is within range of multiple base stations, it is possible to narrow the possible location of the UE based on the locations of the base stations.

However, typical positioning methods require multiple base stations at fixed locations. These methods do not work when the UE is interacting with a single base station that is in motion.

SUMMARY

In some aspects, the disclosure relates to a method for positioning user equipment. The method includes obtaining identification of a first location for a mobile base station at a first moment in time, wherein the mobile base station is in wireless communication with a user equipment at a remote location from the mobile base station and obtaining a first measurement for a characteristic of a first wireless signal transmission between the user equipment and the mobile base station at the first location. The method includes obtaining identification of a second location for the mobile base station at a second moment in time, the second location different from the first location, and obtaining a second measurement for the characteristic of a second wireless signal transmission between the user equipment and the mobile base station at the second location. The method includes determining the remote location of the user equipment based on the first measurement, the second measurement, the first location of the mobile base station, and the second location of the mobile base station.

In some aspects, the disclosure relates to a system for positioning user equipment. The system includes a positioner made up of at least a computer-readable memory and at least one computing processor. The computing processor is configured to obtain identification of a first location for a mobile base station at a first moment in time, wherein the mobile base station is in wireless communication with a user equipment at a remote location from the mobile base station, and obtain a first measurement for a characteristic of a first wireless signal transmission between the user equipment and the mobile base station at the first location. The computing processor is configured to obtain identification of a second location for the mobile base station at a second moment in time, the second location different from the first location, and obtain a second measurement for the characteristic of a second wireless signal transmission between the user equipment and the mobile base station at the second location. The computing processor is configured to determine the remote location of the user equipment based on the first measurement, the second measurement, the first location of the mobile base station, and the second location of the mobile base station.

In some aspects, the disclosure relates to a computer-readable memory storing executable instructions that, when executed by a computing processor, cause the computing processor to obtain identification of a first location for a mobile base station at a first moment in time, wherein the mobile base station is in wireless communication with a user equipment at a remote location from the mobile base station, and obtain a first measurement for a characteristic of a first wireless signal transmission between the user equipment and the mobile base station at the first location. The instructions, when executed by the computing processor, cause the computing processor to obtain identification of a second location for the mobile base station at a second moment in time, the second location different from the first location, and obtain a second measurement for the characteristic of a second wireless signal transmission between the user equipment and the mobile base station at the second location. The instructions, when executed by the computing processor, cause the computing processor to determine the remote location of the user equipment based on the first measurement, the second measurement, the first location of the mobile base station, and the second location of the mobile base station.

BRIEF DESCRIPTION OF THE DRAWINGS

The above and related objects, features, and advantages of the present disclosure will be more fully understood by reference to the following detailed description, when taken in conjunction with the accompanying figures, wherein.

For purposes of clarity, not every component may be labeled in every figure. The drawings are not intended to be drawn to scale. Like reference numbers and designations in the various figures indicate like elements.

DETAILED DESCRIPTION

User equipment ("UE") interacts with a communication network via a radio link between the UE and a network access node, referred to herein as a "base station" without limitation to any particular form or type of network access node. The UE and/or the base station measure transmission characteristics for interactions between the UE and the base station. These characteristics are used to estimate a distance between the UE and the base station, which defines a radius for an arc along which the UE may be located within some reasonable degree of error. The base station may be stationary, e.g., affixed to a tower or other ground-based structure, or the base station may be mobile. In some implementations, the base station is mounted to an airborne platform referred to herein as a high altitude platform ("HAP"). As the HAP moves, relative to a UE, the estimated distances at various times (and HAP locations) correspond to various arcs along which the UE may be located. When the UE location is relatively static, relative to the HAP, the intersection of these various arcs defines an approximate location for the UE. In some implementations, the approximate location is further refined, e.g., using one or more additional techniques described herein.

Figure 1:
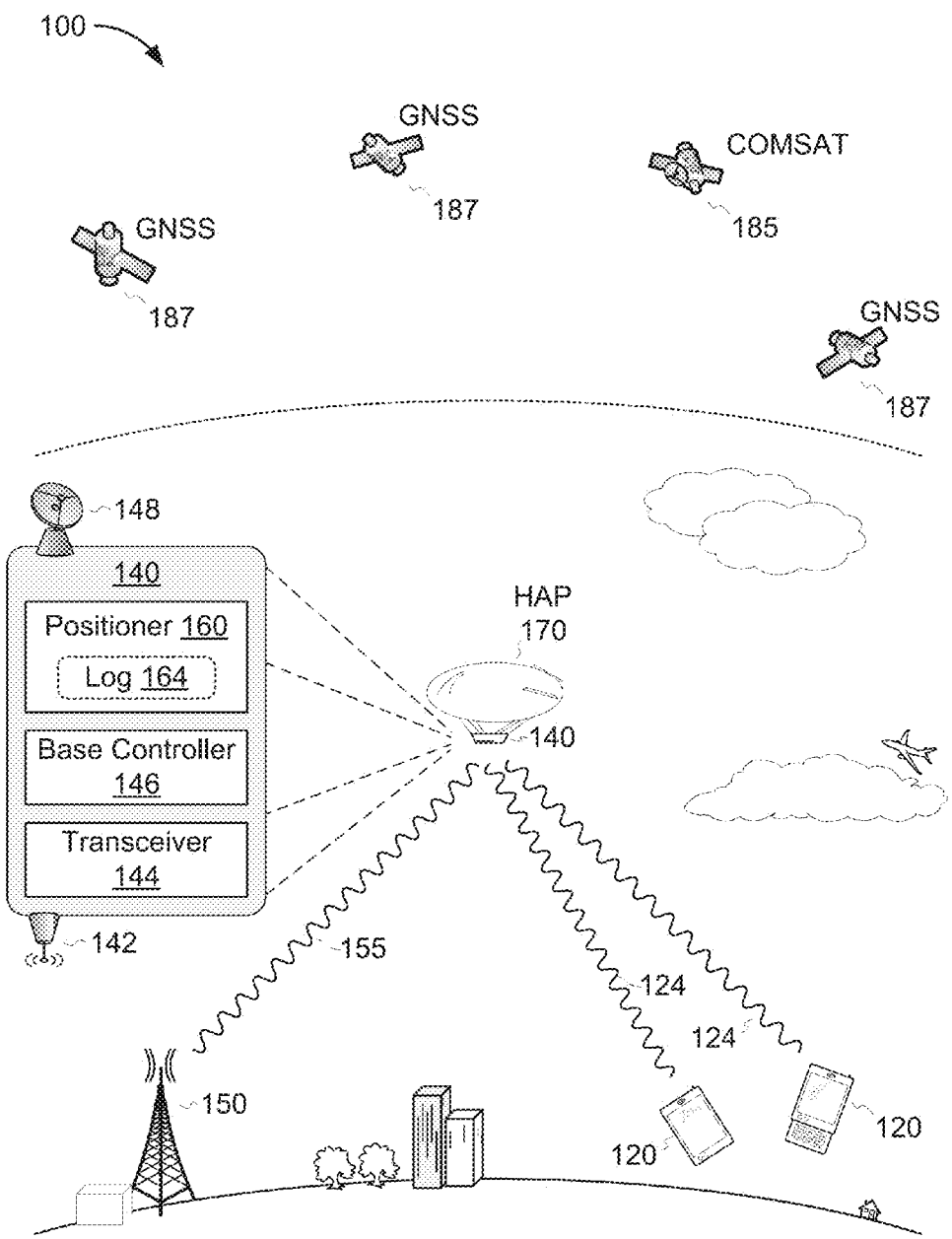
FIG. 1 is a diagram of an example mobile communication environment.

FIG. 1 is a diagram of an example mobile communication environment 100. In broad overview, FIG. 1 depicts example user equipment 120 ("UE") in communication with a base station 140 aboard a high altitude platform 170 ("HAP"). FIG. 1 includes an expanded illustration of the base station 140, depicting a radio antenna 142, transceiver 144, base controller 146, satellite antenna 148, and positioner 160. In some implementations, as shown in FIG. 1, the positioner 160 maintains a log 164. The user equipment 120 interacts with the base station 140 via radio communications 124 received or transmitted by the radio antenna 142. In some implementations, the base station 140 is in communication with a ground station 150 via radio communications 155. In some implementations, the base station 140 is in communication with a communication satellite 185, via the satellite antenna 148. The positioner 160 is a system for identifying a location of the base station 140 (or more generally, the location of the HAP 170) and the locations of the user equipment 120. In some implementations, the positioner 160 identifies the location of the base station 140 (or the HAP 170) based on signals received from Global Navigation Satellite System ("GNSS") satellites 187. Identifying a location is referred to as "positioning," and the identified location may be defined as region of space within which the positioned item is most likely to be present. Although depicted within the base station 140 aboard the HAP 170, the positioner 160 can alternatively be located remotely from the base station 140, or even remotely from the HAP 170, e.g., at the ground station 150. For example, in some implementations, the positioner 160 is located in a ground-based data center or flight control center and receives positioning data from sensors aboard the HAP 170 via one or more wireless data links.

Referring to FIG. 1 in more detail, the example mobile communication environment 100 supports wireless communication with mobile user equipment 120 ("UE"). The UE 120 is a mobile communication device such as a cellular telephone, tablet computing device, mobile modem, laptop or notebook computing device, or any other wireless communication device. The UE 120 interacts with the base station 140 using any wireless communication protocol, such as the Global System for Mobile Communications ("GSM"), Enhanced Data rates for GSM Evolution ("EDGE"), Universal Mobile Telecommunication System ("UMTS"), Code Division Multiple Access ("CDMA"), Time Division Synchronous Code Division Multiple Access ("TD-SCDMA"), High Speed Packet Access ("HSPA"), Long-Term Evolution ("LTE"), LTE Advanced, Long-Term Evolution Time-Division Duplex ("LTE-TDD"), or any other such protocol including, but not limited to, so-called "3G," "4G," and "5G" protocols. The UE 120 is any mobile communication device capable of interacting with a base station 140 to provide communication services such as voice communication, message delivery, and/or packetized data exchange, using any of the aforementioned wireless communication protocols. In some implementations, the UE 120 includes a user interface (e.g., a keypad or touchscreen), a power supply (e.g., a battery), memory, one or more processors (e.g., an application-specific mobile device processor), a radio transceiver, and an antenna or antenna array. In some implementations, the UE 120 includes a microphone and a speaker. In some implementations, the UE 120 includes a Subscriber Identification Module ("SIM") uniquely identifying the UE 120 within the communication environment 100. In some instances, the UE 120 is operated out-of-range of ground-based communication base stations (e.g., ground station 150) and, instead, uses the communication services provided by the airborne base station 140.

The high altitude platform 170 ("HAP") provides an airborne platform for the base station 140. In some implementations, the HAP 170 is an aerostat such as a zeppelin, dirigible, or hot air balloon. In some implementations, the HAP 170 is a fixed-wing airplane. In some implementations, the HAP 170 is a rotorcraft such as a helicopter. In some implementations, the HAP 170 is an unmanned aircraft such as a multi-copter drone. In some implementations, the HAP 170 is controlled remotely, e.g., from a remote flight control center. In some such implementations, the HAP 170 receives control instructions from the remote flight control center via satellite communications or any other combination of wired and wireless network links.

In general, the HAP 170 does not sustain a fixed location. Instead, the HAP 170 travels a route that keeps it within service range of a supported area, e.g., by flying circles, ovals, figure eights, or other such holding patterns. As the HAP 170 moves along its route, it passes through different aerial positions over time. In some implementations, the HAP 170 revisits the same locations in a loop or circuitous route over time. This is referred to as "station keeping."

The base station 140 is aboard the high altitude platform 170. FIG. 1 includes an expanded illustration of the base station 140, depicting a radio antenna 142, transceiver 144, base controller 146, satellite antenna 148, and positioner 160. Although illustrated as a unified structure, the elements of the base station 140 may be implemented as discrete systems installed on the HAP 170. In some implementations, the HAP 170 will carry multiple instances of some or all elements of the base station 140. For example, in some implementations, the HAP 170 carries multiple antennas 142 and multiple transceivers 144. In some implementations, the positioner 160 is aboard the HAP 170, as shown. In some implementations, the positioner 160 is located in a ground-based data center and receives positioning data from the HAP 170 via one or more wireless data links, or any other combination of wired and wireless network links. In some implementations, the HAP 170 is controlled from a remote flight control center. In some such implementations, the positioner 160 is located at the remote flight control center.

The base station 140 includes one or more antennas 142. Each antenna 142 is configured to send radio signals to, and/or receive radio signals from, other radio-based devices, e.g., user equipment 120. In some implementations, each antenna 142 is structured in a manner to conform with a specific radio transmission protocol or standard. In some implementations, at least one antenna 142 is omnidirectional. In some implementations, at least one antenna 142 is directed. A directional antenna broadcasts signals in, or receives signals from, a particular direction and covers less than 360° around the antenna. In some implementations, the coverage region, or slice, for a directional antenna is around 120°. Three 120° directional antennas arranged in a circle around an antenna mast can cover an entire surrounding 360°. Other implementations have different size slices, e.g., six 60° slices, twelve 30° slices, etc. Some implementations do not have full 360° coverage, e.g., only covering a leading or trailing slice. For example, in some implementations, an antenna array may only cover 90°-180° in one direction. In some implementations, coverage may be narrower than 90°.

The base station 140 includes one or more transceivers 144 for converting signals between the antennas 142 and the base controller 146. The transceiver 144 includes receiver circuitry for converting a signal from a radio frequency alternating current received at an antenna 142 and transmitter circuitry for converting a signal to a radio frequency alternating current, which is applied to an antenna 142 for transmission. In some implementations, the transceiver 144 includes an amplifier. In some implementations, a transceiver 144 includes only receiver circuitry (making it a receiver). In some implementations, a transceiver 144 includes only transmission circuitry (making it a transmitter). In some implementations, a transceiver includes combined receiver and transmission circuitry (making it a proper transceiver). In some implementations, the base station 140 includes one transceiver 144 for each antenna 142. In some implementations, the base station 140 includes one transceiver 144 for use with multiple antenna 142.

The base station 140 includes one or more base controllers 146. The base controller 146 includes circuitry, memory, and computing processors for connecting communication transmissions between user equipment 120 and a communication network (not shown). In some implementations, the communication network is a telephony network. In some implementations, the communication network is a data network such as the Internet. In some implementations, the base station 140 is in communication with a ground station 150 that provides a connection to the communication network. In some implementations, the base station 140 is in communication with a communication satellite 185 that provides a connection to the communication network. In some implementations, the base controller 146 is implemented using a general purpose processor. In some implementations, the base controller 146 is implemented using special purpose logic circuitry, e.g., an application specific integrated circuit ("ASIC").

The base station 140 includes one or more satellite antennas 148 for interacting with satellites. In some implementations, the base station 140 is in communication with a communication satellite 185 for access to a communication network and the base station 140 uses a satellite antennas 148 for interacting with the communication satellite 185. In some implementations, the base station 140 receives satellite-based positioning data, e.g., from GNSS satellites 187, via the satellite antennas 148.

The Global Navigation Satellite System ("GNSS") satellites 187 broadcast signals that are used by a receiver to position the receiver. Examples of global navigation satellite systems include the United States' Global Positioning System ("GPS") satellites, Russia's GLObal NAvigation Satellite System ("GLONASS") satellites, Europe's Galileo satellites, India's Regional Navigation Satellite System ("IRNSS"), and China's BeiDou Navigation Satellite System ("BDS"). A device (e.g., a GPS receiver) receiving signals broadcast by these types of global navigation satellites uses the signals to determine a location of the device (i.e., to position the device.) The device then provides position or location information. In some implementations, the base station 140 includes a positioner 160 equipped with such a device for receiving signals from GNSS satellites 187 (e.g., GPS satellites) and generating position or location information. In some implementations, the position or location information includes latitude and longitude coordinates. In some implementations, the position or location information includes altitude. In some implementations, the position or location information includes an accuracy precision level or error estimate.

Still referring to FIG. 1, the illustrated example base station 140 includes a positioner 160. In some implementations, the positioner 160 is co-located with the base station 140 aboard the HAP 170. In some implementations, the positioner 160 is not aboard the HAP 170. The positioner 160 is a system for identifying a location of the base station 140 (or more generally, the location of the HAP 170) and the locations of the user equipment 120. In some implementations, the positioner 160 identifies the location of the base station 140 (or the HAP 170) based on signals received from GNSS satellites 187, as discussed above. In some implementations, the positioner 160 identifies the location of the base station 140 (or the HAP 170) based on signals from ground stations, e.g., ground station 150. In some implementations, the positioner 160 identifies the location of the base station 140 (or the HAP 170) based on celestial navigation, e.g., using a computer vision sextant aboard the HAP 170. In some implementations, the positioner 160 identifies the location of the base station 140 (or the HAP 170) using an on-board inertial guidance system. The onboard inertial guidance system includes sensors for measuring changes in inertia and uses information from the inertial sensors to estimate how far the HAP 170 has moved from a known location. In some implementations, the positioner 160 identifies the location of the base station 140 (or the HAP 170) using a combination of satellite-based, ground-based, celestial navigation, and/or inertia-based systems. In some implementations, the positioner 160 maintain status information that includes the location of the base station 140 (or the HAP 170) at any given moment. In some such implementations, the positioner 160 maintain the status information in a log 164.

In some implementations, as shown in FIG. 1, the positioner 160 maintains a log 164. In some such implementations, the positioner 160 updates the log 164 at regular intervals with an association of a timestamp and location indicator. In some implementations, the location indicator is a latitude, longitude pair. In some implementations, the location indicator is a tuple that includes latitude, longitude, and altitude. In some implementations, the location indicator tuple further includes inertia information, e.g., airspeed or velocity. In some implementations, the positioner 160 updates the log 164 at least once every few (e.g., 5) seconds. In some such implementations, the positioner 160 updates the log 164 at a frequency determined as a function of the speed or velocity of the HAP 170.

The log 164 is computer-readable data recorded to a computer memory storage device, which may be implemented using any device, or collection of devices, suitable for storing computer-readable data. A data storage device may incorporate one or more mass storage devices, which may be co-located or distributed. Devices suitable for storing data include semiconductor memory devices such as EPROM, EEPROM, SDRAM, and Flash memory devices. Devices suitable for storing data include magnetic disks, e.g., internal hard disks or removable disks, magneto optical disks, optical, and other such higher-capacity format disc drives.

In some implementations, the log 164 is stored in a ground-based data center, e.g., at a remote flight control center. In such implementations, larger scale data storage device might be used. Suitable data storage devices include volatile or non-volatile storage, network attached storage ("NAS"), and storage area networks ("SAN"). Data storage devices may be virtualized. Data storage devices may be accessed via an intermediary server and/or via a network. Data storage devices may structure data as a collection of files, data blocks, or chunks. Data storage devices may provide for error recovery using, for example, redundant storage and/or error recovery data (e.g., parity bits).

The storage devices used for the log 164 may host a database, e.g., a relational database. In some implementations, data is recorded in the log 164 as entries in one or more database tables in a database stored in data storage. In some such implementations, the data is accessed using a query language such as the Structured Query Language ("SQL") or a variant such as PostgreSQL. The storage devices used for the log 164 may host a file storage system. Data stored for the log 164 may be structured as a knowledge base.

The positioner 160 also positions user equipment 120 ("UE") in communication with the base station 140. In some implementations, there are multiple positioners 160, e.g., a HAP-positioner for identifying the location of the HAP 170 and a UE-positioner for identifying the location of a UE 120. However, for simplicity, HAP-positioners and UE-positioners are generalized herein as simply positioners 160. In some implementations, a UE 120 includes its own positioning system (e.g., a GPS receiver) and can report its location to the positioner 160. In some such implementations, the UE 120 reports its location periodically. In some implementations, the UE 120 reports its location in concert with a UE-based activity. For example, if the UE 120 is initiating an emergency-services communication, it may include location information (if available). In some implementations, the UE 120 reports its location upon request. However, in some situations, the UE 120 is unable to report its location. For example, the UE 120 might not have accurate location information. This may occur, for example, when a UE-based positioning system is offline or when interference renders the positioning system ineffective (e.g., GPS receivers generally require line-of-site visibility to GPS satellites 187 and thus don't work well indoors or when satellites 187 are obstructed). In a communication provider network that includes multiple fixed-location base stations (e.g., ground station 150), the communication provider network can position the UE 120 based on distance estimates from each of the multiple fixed-location base stations.

Figure 2A:
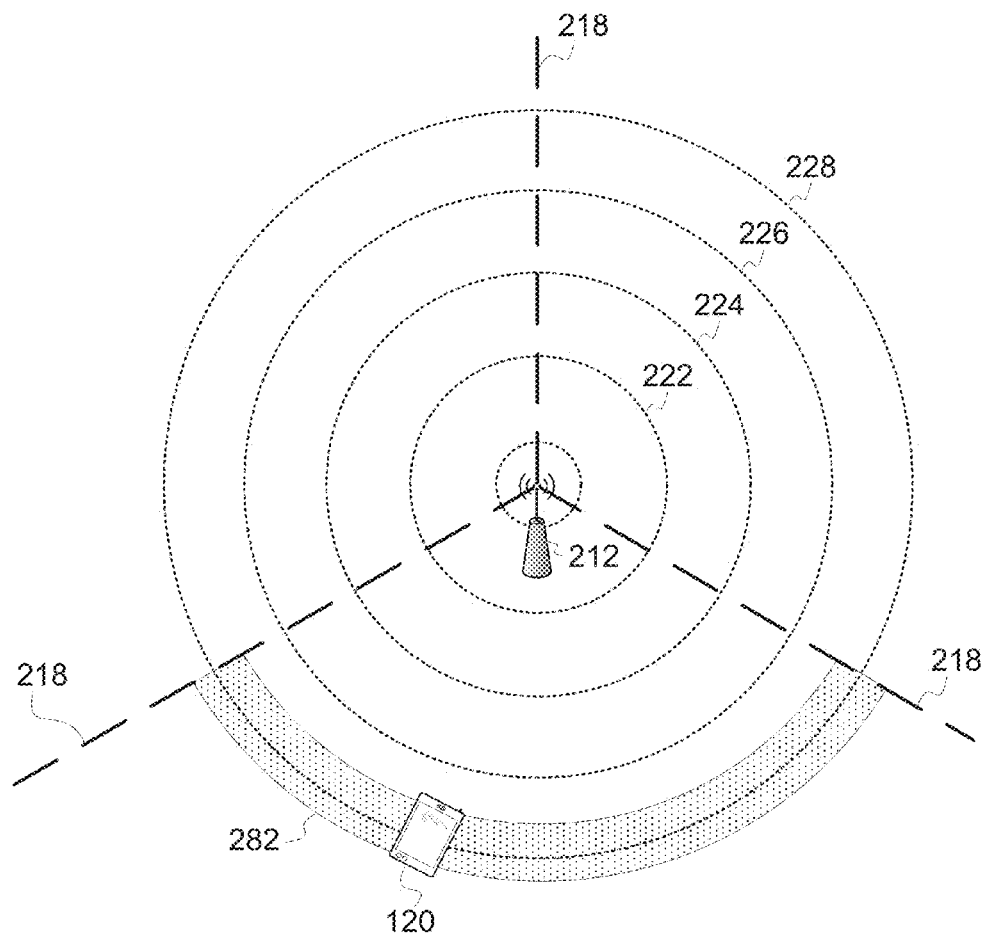
FIG. 2A is a diagram illustrating range finding between an antenna and user equipment.
Figure 2B:
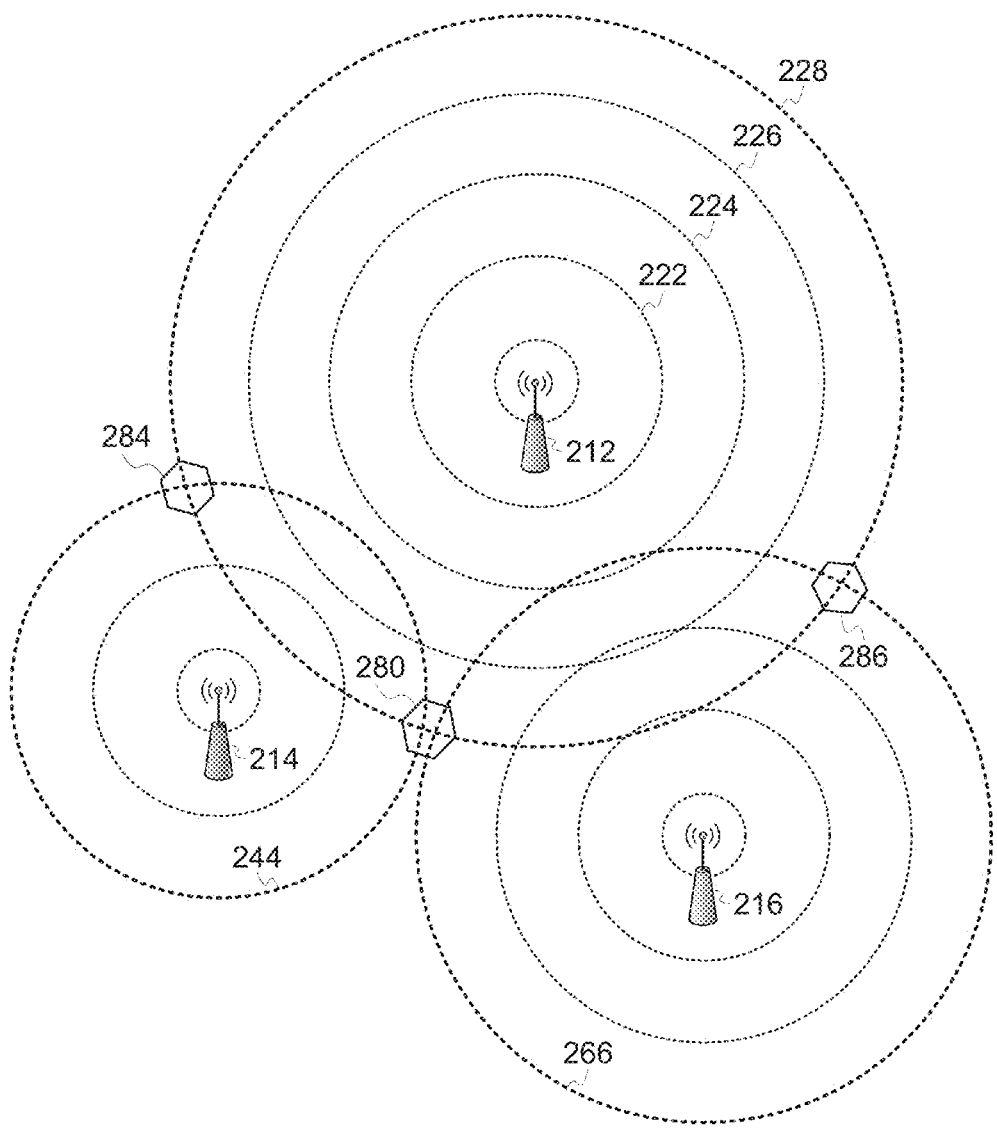
FIG. 2B is a diagram illustrating user equipment positioning.
Figure 2C:
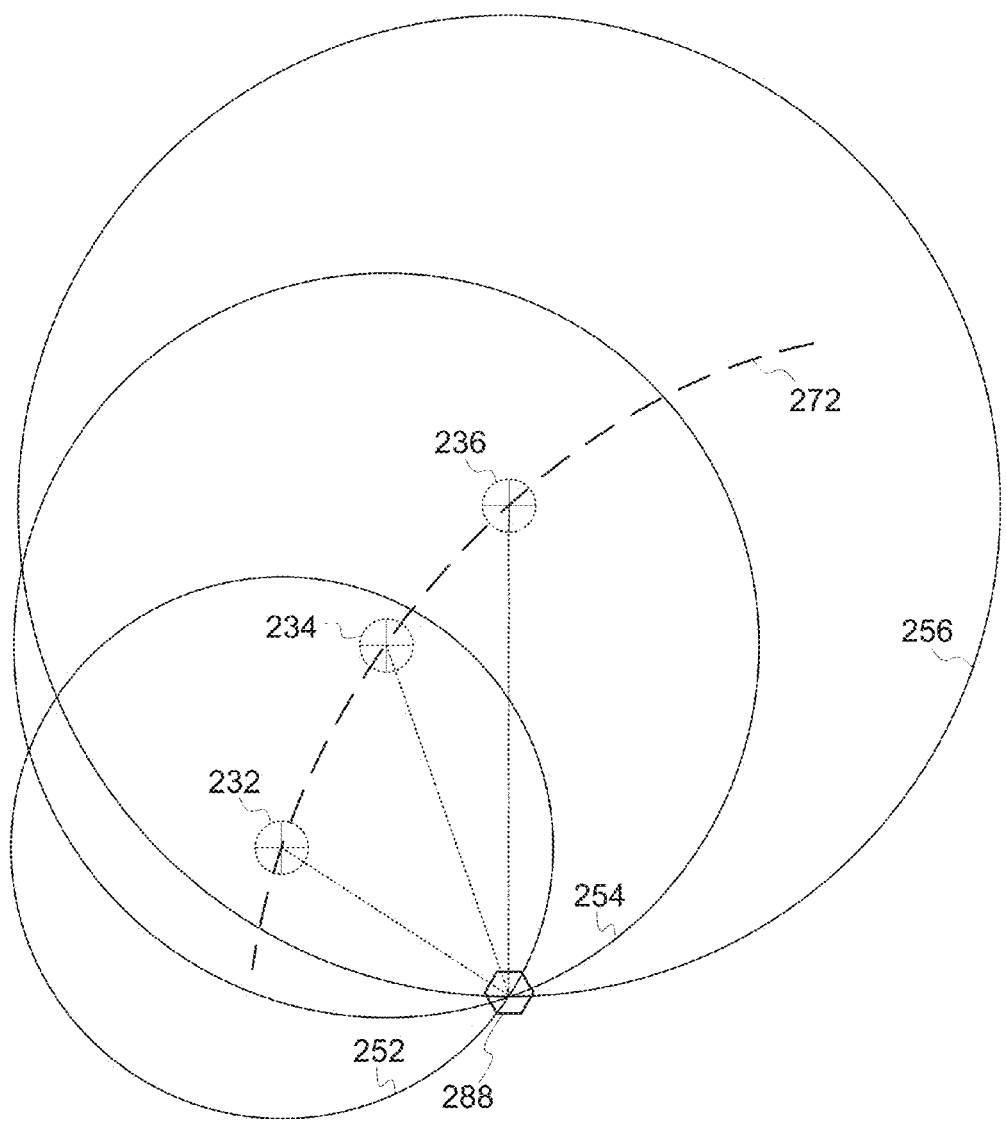
FIG. 2C is a diagram illustrating user equipment positioning from a moving base station.
Figure 2D:
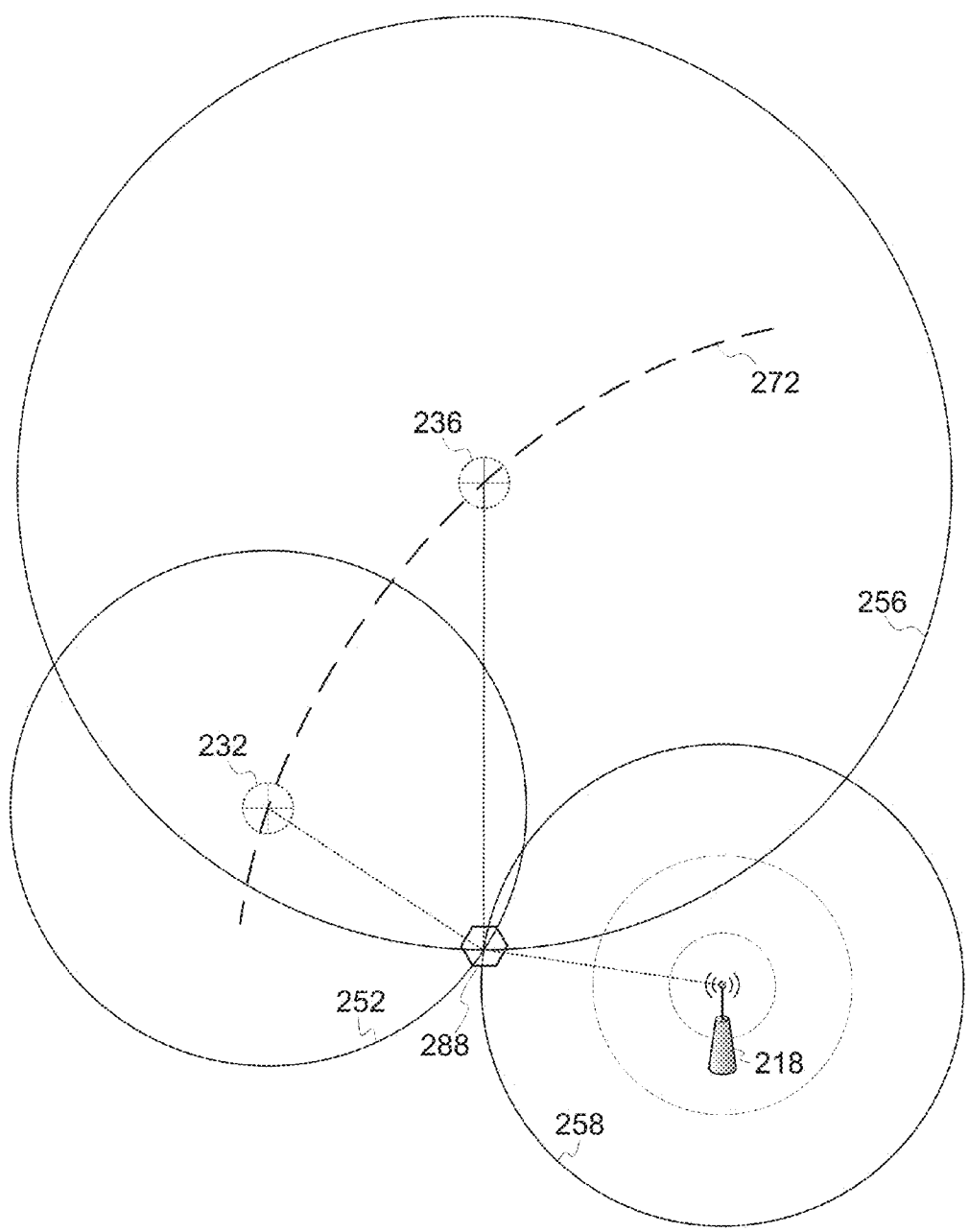
FIG. 2D is a diagram illustrating user equipment positioning from a moving base station and a fixed-location base station.
Figure 3:
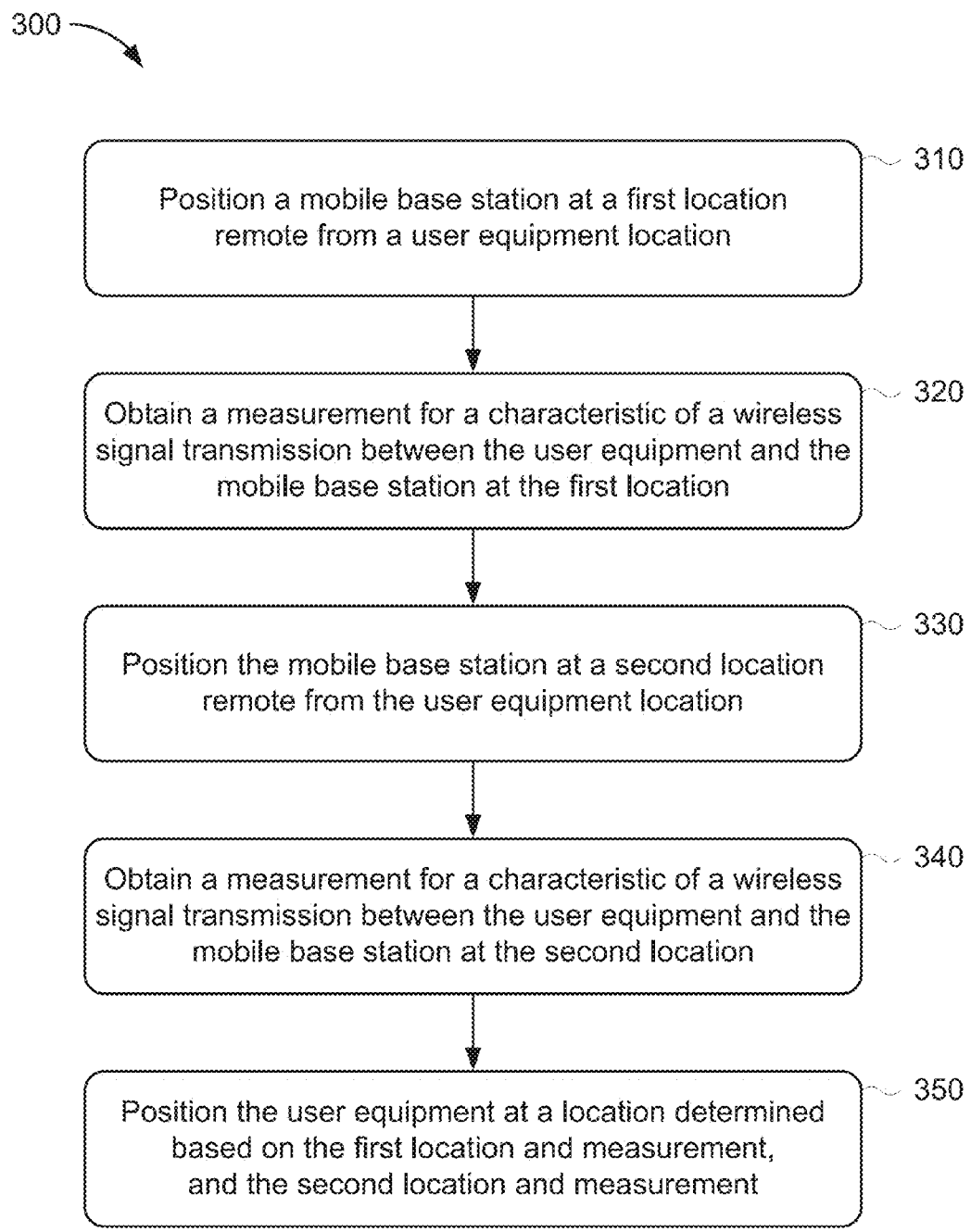
FIG. 3 is a flowchart for an example method of positioning user equipment utilizing motion of a high altitude platform.

FIGS. 2A, 2B, 2C, and 2D, described in detail below, illustrate positioning a UE 120 from a variety of different base station configurations. When base stations are at fixed-locations, the UE 120 can be positioned by estimating its distance from the fixed location of the base station. As shown in FIG. 2A, an estimated distance from a single fixed-location base station is generally not sufficient to position the UE 120 with reasonable accuracy. With multiple fixed-location base stations, as shown in FIG. 2B, the estimated distance from each of the multiple fixed-location base stations allows for improved accuracy, e.g., using triangulation. However, as shown in FIG. 2C, the airborne base station 140 is not at a fixed-location. Further, the coverage area accessible by a high altitude platform 170 is, in some implementations, significantly larger than the coverage area for a typical ground station 150. Accordingly, it's less likely that a UE 120 would be within range of multiple base stations 140 aboard different respective HAPs 170. Nevertheless, the positioner 160 positions a UE 120 based on location information for the single mobile base station 140 (or the HAP 170) as the HAP 170 moves. As illustrated in FIG. 2C, the movement of the HAP 170 allows the positioner 160 to treat measurements from different moments in time (each corresponding to different HAP locations, e.g., as recorded to the log 164) as though they were measurements from different base stations. In some instances, as shown in FIG. 2D, the location information based on the movement of the HAP 170 may be combined with location information from one or more fixed-location base stations. However, it's possible to position a UE 120 without any information from fixed-location base stations. FIG. 3, described in detail below, is a flowchart for an example method 300 of positioning user equipment 120 utilizing motion of a high altitude platform 170. These figures are now described in more detail.

FIG. 2A is a diagram illustrating range finding between an antenna 212 and user equipment 120. A base station may use an omnidirectional antenna or a directed antenna. As shown in FIG. 2A, the illustrated example base station 212 uses directional antennas each covering 120° slices of the area surrounding the base station 212. The edges of each 120° slice are indicated by dashed lines 218. User equipment 120 present within range of the base station 212 interacts with the antenna serving the slice of area encompassing the user equipment 120. As described in more detail below, characteristics of the interaction between the user equipment 120 and the base station 212 are used to estimate a distance between the two. However, the distance estimate is undirected. Concentric range circles 222, 224, 226, and 228 show different distances from the base station 212. However, user equipment 120 may fall anywhere on a range circle. For example, as shown, user equipment 120 is at the range indicated by range circle 228, but the specific location around the range circle 228 is unknown. Even by determining which directional antenna is interacting with the user equipment 120 can only narrow the potential location to the indicated zone 282.

Characteristics of an interaction between the user equipment 120 and the base station 212 are used to estimate a distance between the two. For example, a monitor can measure passage of time between sending a transmission from the base station 212 to the user equipment 120 and receiving a response, i.e., a round trip time. The round trip time is primarily attributable to three main sources of delay: transmission time to the user equipment 120, processing time at the user equipment 120, and transmission time for the response from the user equipment 120. Because the processing time for certain communications is generally constant, a transmission delay time can be calculated from the measured round trip time. The transmission delay time generally corresponds to a distance, although transmission delay is also impacted by transmission interference such as walls and other structures between the user equipment 120 and the base station 212, effectively obstructing transmission. Some implementations also use, or alternatively use, signal strength measures, time of arrival measures, or other measurements of signal or communication characteristics.

In some implementations, where the base station 212 is at a fixed location, the transmission delay time to various locations around the base station 212 is mapped, facilitating correlation from transmission delay time to some path (e.g., range circles 222, 224, 226, or 228) around the base station 212. In some implementations, a mapping system periodically requests location information from user equipment within range of the base station and compares the response location to measurements of the interactions with the responding user equipment, e.g., transmission delay. A database of locations and corresponding measurements is then constructed from these responses and measurements. In some implementations, a monitor compares characteristics for communication between the user equipment 120 and the base station 212 with entries in this database and, based on this comparison, positions the user equipment in an area (e.g., area 282) where devices have previously reported location information with similar communication characteristics. The positioned area 282 around the base station 212 may be fairly large, e.g., on the order of several miles long and hundreds or thousands of yards wide. Ideally, the user equipment 120 should be positioned to a much smaller area.

FIG. 2B is a diagram illustrating user equipment positioning. In FIG. 2B, the user equipment 120 is positioned using multiple base stations 212, 214, and 216. Each base station 212, 214, and 216 is illustrated with concentric range circles showing different distances from the respective base stations. For example, base station 212 is shown with the concentric range circles 222, 224, 226, and 228 from FIG. 2A.

Using two base stations, user equipment that is along the range circle 228 from a first base station 212 and along a range circle 244 from a second base station 214 can be positioned to either location 280 or location 284. Likewise, user equipment that is along the range circle 228 from the first base station 212 and along a range circle 266 from a third base station 216 can be positioned to either location 280 or location 286. However, when the user equipment 120 is estimated to be on range circles 228, 244, and 266 at the same time, then the user equipment 120 is positioned in location 280.

Referring back to FIG. 1, because the base station 140 aboard the high altitude platform 170 is in motion, distance estimates between the base station 140 and user equipment 120 at different times are functionally similar to distance estimates from the different base stations 212, 214, and 216 shown in FIG. 2B. If the user equipment 120 is within the location 280 at each measurement time, then the user equipment 120 can be positioned in this manner.

FIG. 2C is a diagram illustrating user equipment positioning from a moving base station. Illustrated in FIG. 2C is a path 272 travelled by a HAP 170 (not shown in FIG. 2C) as measurements are captured for determining distance from the HAP 170 to a UE 120 (not shown). As the HAP 170 travels the path 272, it will be present at different locations 232, 234, and 236 at different times. The path 272 is illustrated as an arc; however, it may be a straight line, a circle, a figure eight, or any other suitable path. In some implementations, the HAP 170 travels along a path 272 that keeps it within service range of a supported area, this is referred to as station keeping. FIG. 2C includes range circles 252, 254, and 256, corresponding to distances from the respective locations 232, 234, and 236. The range circle 252 around location 232 indicates the estimated distance from the HAP 170 to the UE 120 when the HAP 170 was at location 232; the range circle 254 around location 234 indicates the estimated distance from the HAP 170 to the UE 120 when the HAP 170 was at location 234; and the range circle 256 around location 236 indicates the estimated distance from the HAP 170 to the UE 120 when the HAP 170 was at location 236. The three range circles 252, 254, and 256 intersect at location 288. Accordingly, the positioner 160 using the range data represented in FIG. 2C can position the UE 120 within the location 288. In practice, the range data is not always sufficiently accurate for the positioner 160 to determine the location 288 with sufficient precision. For example, the range circles 252, 254, and 256 might not intersect as nicely as shown. Instead, in some implementations, the positioner 160 identifies the most likely set of intersecting range circles. In some implementations, multiple locations may be identified as possible locations for the UE 120 and the positioner 160 uses additional information to position the UE 120 at one of the possible locations.

FIG. 2D is a diagram illustrating user equipment positioning from a moving base station and a fixed-location base station. Illustrated in FIG. 2D, as in FIG. 2C, is the path 272 travelled by the HAP 170 as measurements are captured for determining distance from the HAP 170 to the UE 120. FIG. 2D includes range circles 252 and 256, corresponding to distances from the locations 232 and 236, respectively, as shown and described in relation to FIG. 2C. Shown in FIG. 2D is a fixed-location base station 218 with a range circle 258 indicating an estimated distance between the UE 120 and the fixed-location base station 218. In some implementations, the UE 120 may receive signals from one or more fixed-location base stations, e.g., base station 218. The UE 120 may have full access to service from the fixed-location base station 218 or may merely be able to detect a signal and report the detected signal to the mobile base station 140. In some implementations, the positioner 160 has access to the range information for the range circle 258 to the fixed-location base station 218 and uses this additional information to improve the positioning of the UE 120 at the location 288.

In general, the positioner 160 will use the best information available to position the UE 120. If the UE 120 is able to report a satellite-based location, e.g., from GNSS satellites 187, the satellite-based location information may be used by the positioner 160 to position the UE 120. If the UE 120 is able to report signal characteristics from one or more fixed-location base stations, or if the fixed-location base stations are able to report signal characteristics for the UE 120, the positioner 160 can use these signal characteristics to position the UE 120. If the only information available is derived from interactions between the UE 120 and the mobile base station 140 aboard the high altitude platform 170, the information derived from such interactions is used by the positioner 160 to position the UE 120. The granularity or accuracy of the position determined by the positioner 160 may be dependent on the sources of the information obtained.

FIG. 3 is a flowchart for an example method 300 of positioning user equipment 120 utilizing motion of a high altitude platform 170 ("HAP"). In broad overview of the method 300, a positioner 160 positions a HAP 170 at a first location at stage 310. At stage 320, the positioner 160 obtains a measurement for a characteristic of a wireless signal transmission between the user equipment 120 and the mobile base station 140 while the HAP 170 is at the first location. Subsequently, at stage 330, the positioner 160 positions the HAP 170 at a second location, different from the first location, e.g., due to movement of the HAP 170. At stage 340, the positioner 160 obtains a measurement for a characteristic of a wireless signal transmission between the user equipment 120 and the mobile base station 140 at the second location. Then, at stage 350, the positioner 160 determines a location for the user equipment 120 based on the first location and measurement, and the second location and measurement.

Referring to FIG. 3 in more detail, at stage 310, a positioner 160 positions a high altitude platform 170 ("HAP") at a first location. The positioner 160 positions the HAP 170 by identifying the location, or determining an approximate location, of the HAP 170. In some implementations, the positioner 160 more specifically positions the base station 140 that is aboard the HAP 170; however, for simplicity, this is generalized to positioning the HAP 170 itself. In some implementations, the positioner 160 is aboard the HAP 170. In some implementations the positioner 160 receives data from sensors or antennas that are aboard the HAP 170; in some such implementations, the positioner 160 is not aboard the HAP 170. In some implementations, the positioner 160 positions the HAP 170 based on signals from GNSS satellites 187, e.g., Global Positioning System ("GPS") satellites. In some implementations, the positioner 160 positions the HAP 170 based on signals from ground stations. In some implementations, the positioner 160 positions the HAP 170 based on celestial navigation. In some implementations, the positioner 160 positions the HAP 170 using an on-board inertial guidance system. In some implementations, the positioner 160 positions the HAP 170 using a combination of satellite-based, ground-based, celestial navigation, and/or inertia-based systems.

In some implementations, having positioned the HAP 170, the positioner 160 records location indicator information to a log 164. For example, in some implementations, the location indicator information is an n-tuple that includes date, time, latitude, longitude, altitude, airspeed, and a direction vector (i.e., velocity).

At stage 320, the positioner 160 obtains a measurement for a characteristic of a wireless signal transmission between the user equipment 120 and the mobile base station 140 while the HAP 170 is at the first location. In some implementations, the positioner 160 obtains signal strength measurements for one or more signals broadcast by the base station 140 and received by the UE 120. In some implementations, the positioner 160 obtains measurements corresponding to a transmission time for signals transmitted between the user equipment 120 and the base station 140.

In some implementations, the positioner 160 obtains signal strength measurements for one or more signals broadcast by the base station 140 and received by the UE 120. The UE 120 receives various signals from the base station 140 and reports the respective strength of each signal received. For example, in most wireless communication protocols or standards, the base stations broadcast availability signals and there is a procedure for the UE 120 to identify and select a base station with the strongest availability signal. In some implementations, the mobile base station 140 uses multiple directed antennas 142 pointed towards adjacent or overlapping regions on the ground, each antenna 142 broadcasting availability signals in a different frequency range or with a different channel marker. In some implementations, antennas 142 for non-adjacent/non-overlapping regions may reuse the same frequency range or channel marker as other antennas 142 for other non-adjacent/non-overlapping regions. The UE 120 reports the strength of each such signal. In some implementations, the base station 140 collects these signal strength measurements and reports them to the positioner 160. In some implementations, the positioner 160 obtains these signal strength measurements and compares the signal strength for each of these availability signals to position the UE 120.

In some implementations, the positioner 160 obtains measurements corresponding to a transmission time for signals transmitted from the UE 120 to the base station 140. Examples of such measurements include measurements of round trip time, transmission delay, and observed time of arrival. In some implementations, the positioner 160 obtains measurements for round trip time for a communication between the user equipment 120 and the base station 140. In some implementations, the positioner 160 obtains measurements for transmission delay between the user equipment 120 and the base station 140. In some implementations, the base station 140 measures timing delay for a UE 120 each time it detects a transmission from the UE 120 and reports this information to the positioner 160. In such implementations, the positioner 160 records an initial timing delay from a signal from the user equipment 120, e.g., an attempt by the user equipment 120 to use the random-access channel ("RACH") allocated under certain protocols (e.g., GSM). Each time the UE 120 transmits, the base station 140 measures the UE's uplink timing error and the positioner 160 updates the recorded timing delay. In some implementations, the base station 140 records an observed time of arrival for certain (or all) transmissions from the UE 120. Where transmissions are expected to arrive at a fixed interval, a change in interval length between times of arrival indicates a change in transmission delay corresponding to a change in distance. In some implementations, some of the transmissions from the UE 120 include a timestamp indicating when the transmission was sent by the UE 120. The observed time of arrival minus the timestamp indicates a transmission time. In some implementations, the base station 140 attempts to ensure validity of the timestamp by managing a clock on the UE 120, e.g., using Network Time Protocol ("NTP"), and relies on the UE 120 to use the managed clock for the timestamp. In some implementations, the base station 140 (or the positioner 160) corrects for inaccuracies in timestamps, e.g., by analyzing a series of transmission arrival times (i.e., observed times of arrival) and calculating an offset for the reported timestamps.

In some traditional protocols, e.g., Long-Term Evolution ("LTE"), the UE 120 may be located by comparing differences in arrival times of the same message (or signal) at different fixed-location base stations; this is known as time difference of arrival ("TDOA"). In some implementations, the positioner 160 has information from multiple base stations, e.g., a fixed-location base station and the mobile base station 140. In some such implementations, the positioner 160 uses TDOA to position the UE 120. In some implementations, the positioner 160 only has information from the mobile base station 140. In some such implementations, the positioner 160 approximates TDOA. For example, in LTE, the UE 120 communicates with the base station at regular uplink and downlink intervals separated by guard intervals. The amount of time between the start of each interval is predictable; in LTE it is usually fixed at 1 ms between uplink events. By recording a time of arrival for the start of each uplink, the positioner 160 can determine if the amount of time between uplink events has changed. If the amount of time between uplink events increases, this indicates that the distance between the mobile base station 140 and the UE 120 has increased. Likewise, if the amount of time between uplink events decreases, this indicates that the distance between the mobile base station 140 and the UE 120 has decreased. In some implementations, the amount of time between uplink events, the amount of the change in the time of arrival, and the rate of this change are used by the positioner 160 to position the UE 120. In some implementations, the UE 120 similarly measures time of arrival for messages from the base station, e.g., at the start of each downlink interval, and reports these time of arrival measurements back to the base station. In some such implementations, the positioner 160 compares the measurements reported by the UE 120 to measurements obtained by the base station, e.g., the mobile base station 140.

In some implementations, the positioner 160 obtains additional information characterizing the message. For example, such additional information may include signal phase at the beginning of each uplink event, the angle of arrival for signals from the UE 120, the position or orientation of the receiving antenna. In some implementations, the positioner 160 uses this information to refine positioning of the UE 120. For example, the time of arrival information may allow positioning the UE 120 at multiple distinct locations, but the additional information may enable the positioner 160 to rule out invalid or impossible locations, i.e., rule out locations that would be inconsistent with the additional information.

In some implementations, the positioner 160 uses a combination of measurements. In some implementations, the base station 140 collects the measurements at regular intervals. In some implementations, the base station 140 collects the measurements continuously. The positioner 160 uses the obtained measurements to estimate a distance from the location of the HAP 170 to the UE 120 at the moment the HAP 170 is at the first location.

In some implementations, the base station 140 measures an angle of arrival for signals from the user equipment 120. In some implementations, the positioner 160 uses the location of the HAP 170 and the angle of arrival for a signal from the UE 120 to position the UE 120.

At stage 330, the positioner 160 positions the HAP 170 at a second location, different from the first location, e.g., due to movement of the HAP 170. As the HAP 170 moves, e.g., station keeping, the location of the HAP 170 changes relative to the ground and to the UE 120 on the ground. The positioner 160 monitors the movement of the HAP 170. In some implementations, the positioner 160 updates a log 164 with position or location information as the HAP 170 moves.

At stage 340, the positioner 160 obtains a measurement for a characteristic of a wireless signal transmission between the user equipment 120 and the mobile base station 140 at the second location. The positioner 160 essentially repeats stage 320, only now the HAP 170 is in a new location. If the UE 120 has not moved, or has not moved much compared to the movement of the HAP 170, then the new measurements will reflect a new vector for positioning the UE 120.

At stage 350, the positioner 160 determines a location for the user equipment 120 based on the first location and measurement, and the second location and measurement. With each new measurement collected by the positioner 160, the accuracy of an estimated location of the user equipment 120 is improved. Referring to FIG. 2B, the effect of the movement of the HAP 170 simulates the location information obtained from the multiple base stations 212, 214, and 216. However, unlike the multiple base stations used in FIG. 2B, all of the measurements used by the positioner 160 may be from a single mobile base station 140, e.g., as described above in reference to FIG. 2C. In some implementations, the positioner 160 may obtain measurements and/or distance information from multiple base stations. For example, in some instances a UE 120 may be in communication with, or aware of (e.g., by monitoring for base station availability), both a fixed-location base station and the mobile base station 140 aboard the HAP 170. In some instances, the single fixed-location base station, e.g., as shown in FIG. 2D, might not be able to acquire enough information to position the UE 120 with sufficient accuracy for some purposes. However, the positioner 160 can use the information from the fixed-location base station to improve the accuracy of the UE 120 position that it determined based on the information from the mobile-base station 140. In some implementations, additional information from a fixed-location base station allows the positioner 160 to position the UE 120 with fewer measurements from the mobile base station 140. In some implementations, the additional information from the fixed-location base station allows the positioner 160 to position the UE 120 more rapidly. However, as described herein, in some implementations, access to information from a fixed-location base station is not necessary.

In some implementations, the positioner 160 compares the measurements of the characteristic of the wireless signal transmissions between the user equipment 120 and the mobile base station 140. Changes in transmission time are attributable to changes in the distance between the user equipment 120 and the base station 140 as the HAP 170 moves. In some implementations, this relative difference is used by the positioner 160 to narrow the potential location of the user equipment 120, thus enabling the positioner 160 to position the user equipment 120 more accurately.

In some implementations, the positioner 160 obtains measurements for relative signal strengths of multiple signal beams concurrently or contemporaneously transmitted from the mobile base station 140 to the user equipment 120. The positioner 160 then positions the user equipment by comparing the relative signal strength of the multiple signal beams.

In some implementations, the high altitude platform ("HAP") 170 hosts multiple directed antennas 142 each broadcasting signals 124 at different frequencies, or in different frequency ranges, or with different channel markers (e.g., a CDMA modulation code). The broadcast from these multiple directed antennas 142 forms a pattern of different zones within the coverage area, i.e., on the ground. As the HAP 170 moves, the pattern of zones also moves. In some implementations, the base station 140 determines which frequencies (or channels) the user equipment 120 is receiving and reports this information to the positioner 160. In some implementations, the user equipment 120 reports signal strengths for the different frequencies, frequency ranges, or channel markers. In some implementations, the channel markers, signal frequencies, or frequency ranges, are used for communication in accordance with a particular wireless communication standard or protocol. In such implementations, the UE 120 reports the signal strength of the available communication channels or frequencies as part of the ordinary behavior of the UE 120 in accordance with the particular wireless communication standard or protocol. The positioner 160 then uses the signal strength information and the pattern of different zones within the coverage area to position the user equipment 120.

Figure 4:
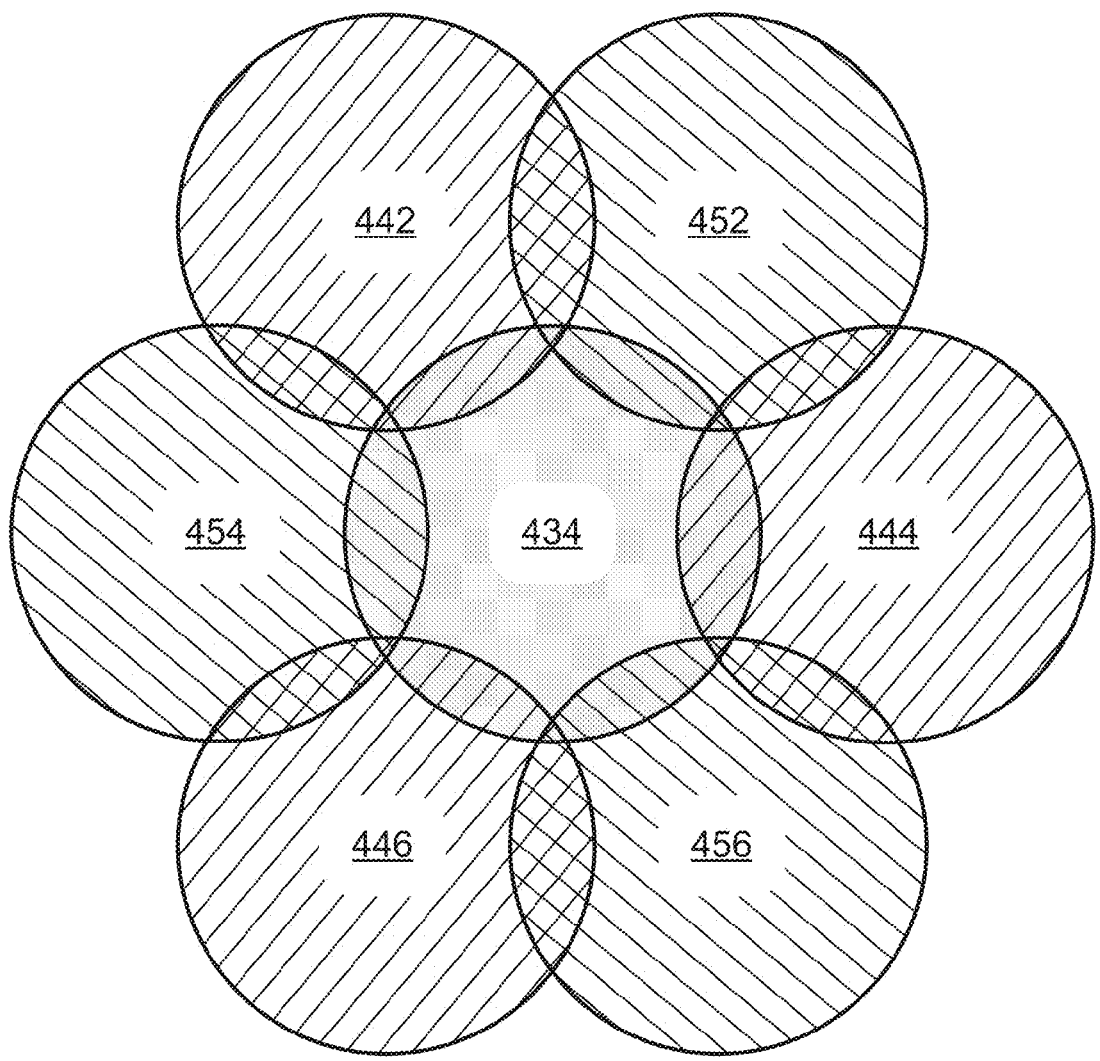
FIG. 4 is a diagram illustrating an example pattern of coverage zones.

FIG. 4 is a diagram illustrating an example pattern of coverage zones. Each circle 434, 442, 444, 446, 452, 454, and 456, represents a zone covered, for example, with a particular frequency or frequency range. Frequencies, or frequency ranges, may be reused within the pattern, but ideally adjacent (and potentially overlapping) circles do not use the same frequency or frequency range. For example, circle 434 might use a first frequency "A," circles 442, 444, and 446 might use a second frequency "B," and circles 452, 454, and 456 might use a third frequency "C." Thus, none of the circles 442, 444, 446, 452, 454, and 456 adjacent to circle 434 (which uses frequency A in this example) use the same frequency as circle 434. Likewise, circle 456 (which uses frequency C in this example) is adjacent to circles 434, 444, and 446, none of which use frequency C. In some implementations, all of the zones use the same frequencies, but each zone has a different identifier, cell identifier, channel marker, CDMA modulation code, etc. In some implementations, the pattern of coverage zones is limited to three channels or frequency ranges, e.g., as shown in FIG. 4. In some implementations, the pattern of zones uses more than three channels or frequency ranges. The pattern illustrated in FIG. 4 is an example pattern with three zone types, but is not meant to be limiting; other zone patterns may be used. For example, in some implementations, four different zone types are used. This description of FIG. 4 generally refers to the different zone types as different frequencies, but it should be understood that they could be distinguished by traits other than frequency, e.g., cell identifier, channel marker, or CDMA modulation code.

In some implementations, a particular UE 120 present within the pattern of coverage zones will report signal strengths for each of the frequencies or frequency ranges. A UE 120 in the middle of a coverage zone, e.g., in the center of circle 434, will report a strong signal for the frequency associated with that coverage zone, e.g., frequency A. A UE 120 closer to the edge of a coverage zone is more likely to report a weaker signal for the frequency associated with that coverage zone. Further, the UE 120 close to the edge of a coverage zone is more likely to have some signal reception for frequencies of neighboring or adjacent coverage zones. In some implementations, the positioner 160 compares the relative strength of the different signals to place the UE 120 in possible locations within the pattern of coverage zones. Because the multiple signals are from the base station 140 to the user equipment 120, any obstruction or other source of interference will have a similar effect on all of the multiple signals. Thus a comparison of the relative signal strengths will be accurate regardless of interference. In some implementations, the base station 140 determines an angle of arrival for signals from a UE 120. In some such implementations, the positioner 160 uses the angle of arrival information to narrow the possible locations.

As the high altitude platform 170 moves, the location of the UE 120 within the pattern of coverage zones will change. The positioner 160 uses these changes to position the UE 120.

Figure 5:
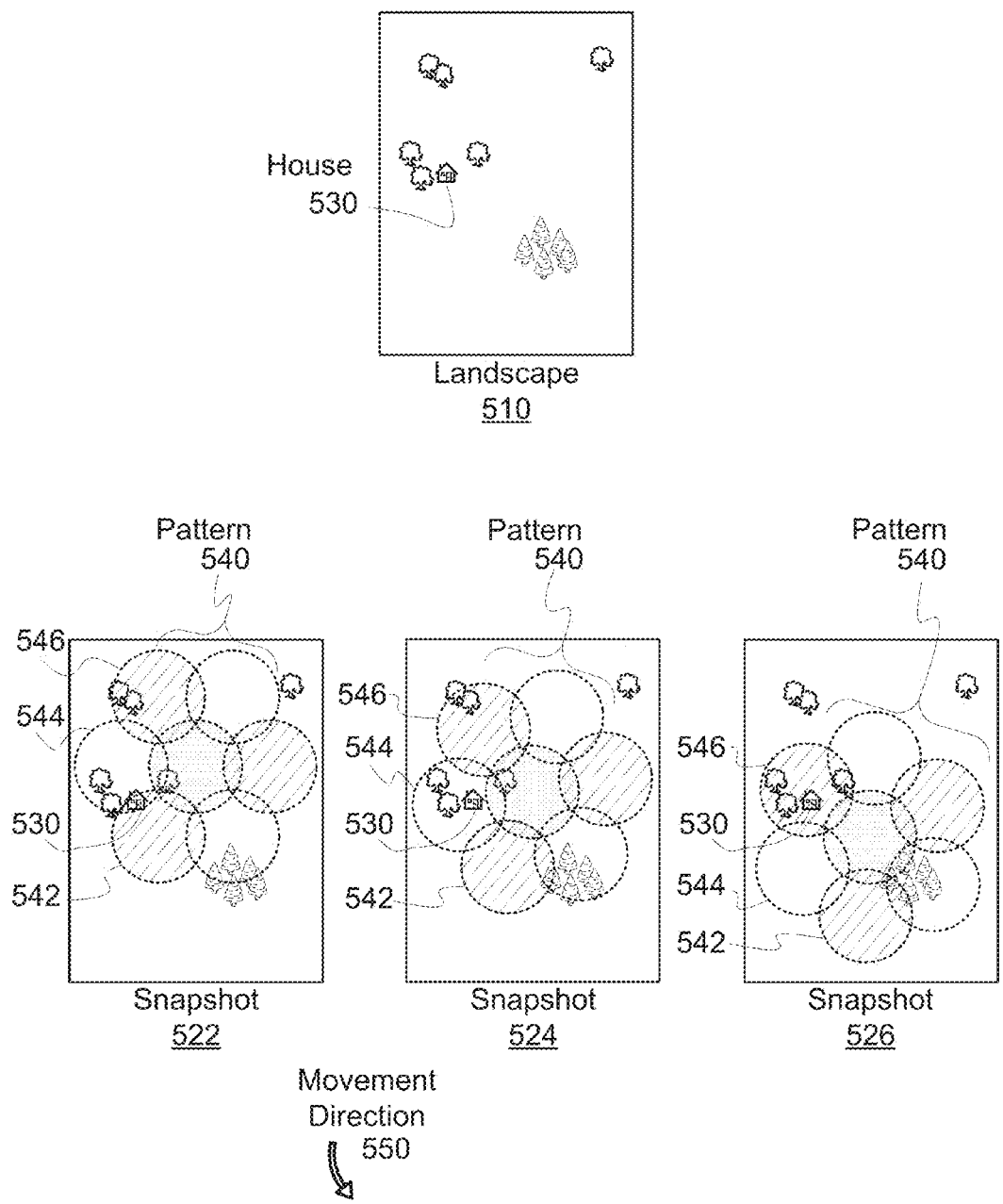
FIG. 5 is a diagram illustrating an example of the pattern of coverage zones moving across a landscape.

FIG. 5 is a diagram illustrating an example of the pattern of coverage zones 540 moving across a landscape 510. In brief overview of FIG. 5, the example landscape 510 features a house 530 where a UE 120 is in use. In snapshot 522, the pattern of coverage zones 540 is in a first position wherein the house 530 is within zones 542 and 544. In snapshot 524, the pattern of coverage zones 540 has moved to a second position wherein the house 530 is only within zone 542. In snapshot 526, the pattern of coverage zones 540 is in a third position wherein the house 530 is primarily within zone 546, on the edge of zone 544. Each snapshots 522, 524, and 526 represents a different moment in time. The house has not moved, but the coverage area within the pattern of coverage zones 540 has moved downwards with a slight rotation in the direction of arrow 550, e.g., resulting from the motion of the HAP 170.

The positioner 160 uses the differences between snapshots 522, 524, and 526 to position the UE 120 within the house 530. In snapshot 522, the UE 120 reports relatively equal signal strengths for the frequencies or frequency ranges broadcast in zones 542 and 544. This information narrows the possible locations of the UE 120 to overlapping zones within the pattern 540. In snapshot 524, the pattern 540 has moved in the direction 550 and the UE 120 now reports stronger signal strength for the frequencies or frequency ranges broadcast in zone 544, as compared to zone 542. Additionally, although not in the central zone, the UE 120 may now report a weak signal strength for the frequencies or frequency ranges broadcast from the nearby central zone. In snapshot 526, the pattern 540 has continued to move in the direction 550 and the UE 120 now reports a weak signal strength (if any) for the frequencies or frequency ranges broadcast in zone 544 and a comparatively stronger signal strength for the frequencies or frequency ranges broadcast in zone 546. The positioner 160 combines its information regarding the location of the HAP 170, which indicates the location of the pattern 540 on the landscape 510, and the signal strength information received from the UE 120 contemporaneously with each of snapshots 522, 524, and 526, to narrow the possible location of the UE 120 to in or near the house 530. The positioner 160 then positions the UE 120 proximate to the house 530 based on this information.

In some implementations, the pattern 540 rotates as the HAP 170 moves. For example, in some implementations, although the HAP 170 may travel in one direction (e.g., as indicated by the arrow 550), the base station 140 may adjust the onboard antennas 142 to maintain service to a particular region. As a result of this adjustment, the pattern 540 does not travel in a straight line, and instead spins or rotates. In some implementations, the spin or rotation is more pronounced than the travel. For example, in some implementations, the base station 140 may attempt to keep the antennas 142 directed to the same service area. As a result, the central zone might not move significantly, while the zones around the central zone may effectively orbit the central zone as the direction of the antennas 142 is adjusted.

In some implementations, the HAP 170 travels a circular route that keeps the frequency pattern above the same region without separately adjusting the direction of the antennas 142. In some implementations, the positioner 160 has sufficient information about the location of the HAP 170 and the pattern 540 projected on the landscape 510 to use the signal strength reports received from the UE 120 to position the UE 120 and/or to make positioning refinements.

Figure 6:
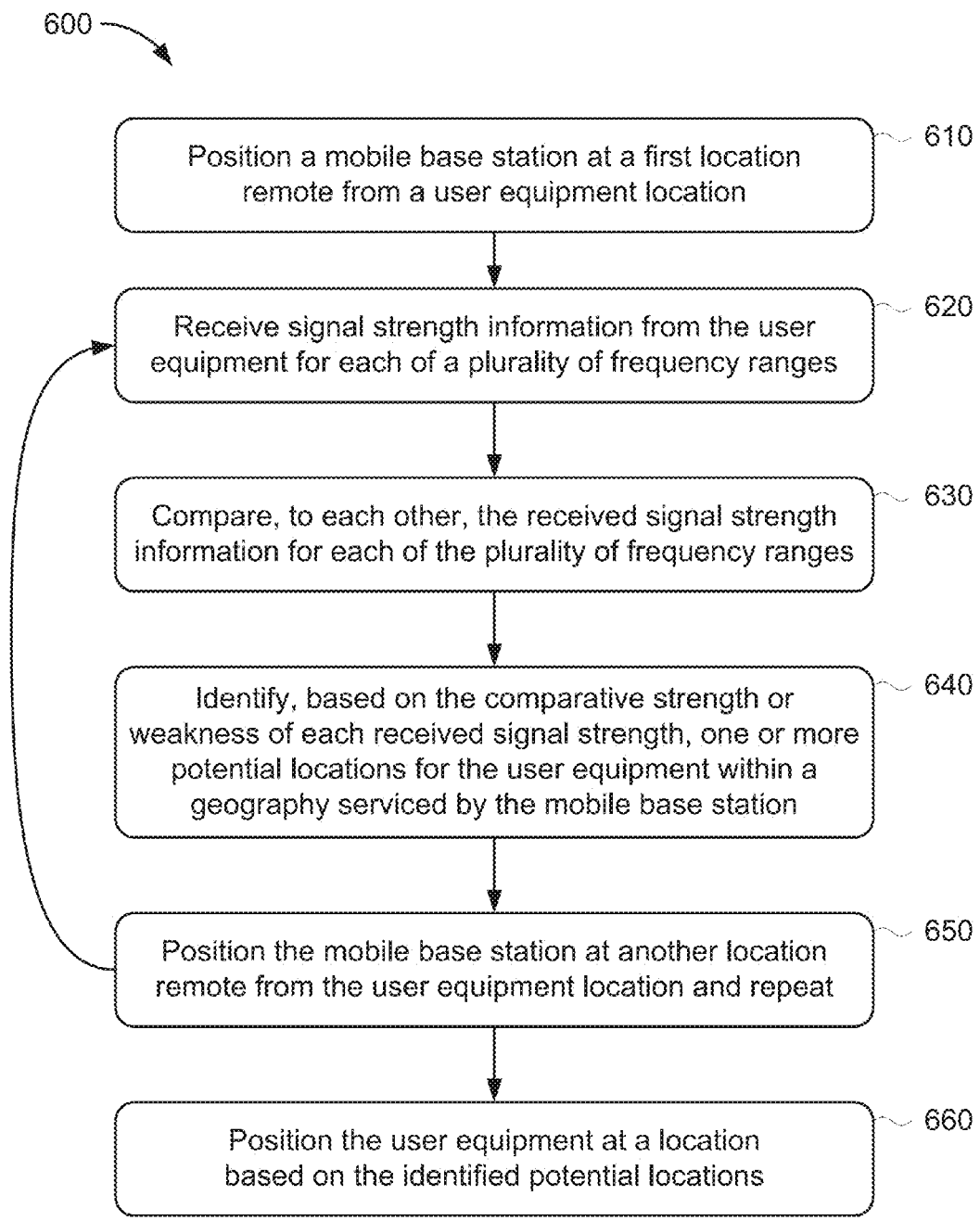
FIG. 6 is a flowchart for an example method of positioning user equipment utilizing motion of a pattern of coverage zones serviced from a high altitude platform.

FIG. 6 is a flowchart for an example method 600 of positioning user equipment 120 utilizing motion of a pattern 540 of coverage zones serviced from a high altitude platform 170. In broad overview, at stage 610, a positioner 160 positions the mobile base station 140 at a first location remote from the user equipment 120 location. At stage 620, the positioner 160 receives signal strength information from the user equipment 120 for each of a plurality of frequency ranges. At stage 630, the positioner 160 compares, to each other, the received signal strength information for each of the plurality of frequency ranges. At stage 640, the positioner 160 identifies, based on the comparative strength or weakness of each received signal strength, one or more potential locations for the user equipment within a geography serviced by the mobile base station. At stage 650, the positioner 160 positions the mobile base station 140 at another location remote from the user equipment location and repeats stage 620. Stages 620, 630, 640, and 650 are repeated as the high altitude platform 170 moves. Then, when a location is needed for the user equipment 120, the method 600 proceeds to stage 660, wherein the positioner 160 positions the user equipment 120 at a location based on the identified potential locations from the repeated iterations of stage 640.

Referring to FIG. 6 in more detail, at stage 610, a positioner 160 positions the mobile base station 140 at a first location remote from the user equipment 120 location. For example, referring to FIG. 5, the user equipment 120 may be located in the house 530. The mobile base station 140 is aboard the high altitude platform 170 ("HAP"), which is airborne several hundred, thousand, or tens of thousands of feet above a geography that includes the user equipment 120 location. In some implementations, the positioner 160 positions the HAP 170 based on signals from GNSS satellites 187, e.g., Global Positioning System ("GPS") satellites. In some implementations, the positioner 160 positions the HAP 170 based on signals from ground stations. In some implementations, the positioner 160 positions the HAP 170 based on celestial navigation. In some implementations, the positioner 160 positions the HAP 170 using an on-board inertial guidance system. In some implementations, the positioner 160 positions the HAP 170 using a combination of satellite-based, ground-based, celestial navigation, and/or inertia-based systems.

At stage 620, the positioner 160 receives signal strength information from the user equipment 120 for each of a plurality of frequency ranges. The frequency ranges are part of a pattern, e.g., the zone pattern illustrated in FIG. 4. In some implementations, the base station 140 broadcasts the frequency ranges in such a pattern over a service area. For example, FIG. 5 illustrates a frequency pattern 540 broadcast over a small landscape 510. In various implementations, the service area can be anywhere from a fraction of a mile to hundreds of miles across, depending on the altitude of the HAP 170 and the broadcast power and reception sensitivity of the transceivers 144. The user equipment 120 detects one or more of the signals from the pattern. In some implementations, the UE 120 reports the signal strengths for the detected signals back to the base station 140, which then forwards the received signal strength information to the positioner 160. In some implementations, the signal frequencies or frequency ranges are frequency ranges used for communication in accordance with a particular wireless communication standard or protocol. In such implementations, the UE 120 reports the signal strength of the available communication frequencies as part of the ordinary behavior of the UE 120 in accordance with the particular wireless communication standard or protocol.

At stage 630, the positioner 160 compares, to each other, the received signal strength information for each of the plurality of frequency ranges. The positioner 160 assess the received signal strength information to determine if a particular frequency or frequency range is stronger than other frequencies or frequency ranges within the frequency pattern. By comparing the magnitude of each signal strength to the other signal strengths, the positioner 160 narrows the possible location of the user equipment 120 within the pattern. In some implementations, the positioner 160 compares the received signal strength information to signal strength information for known locations, e.g., from a database of previously received signal strength information from devices that were able to also report satellite-based location information.

At stage 640, the positioner 160 identifies, based on the comparative strength or weakness of each received signal strength, one or more potential locations for the user equipment within a geography serviced by the mobile base station. For example: if the UE 120 reports strong signal in one frequency range, e.g., "A," and little or no signal strength for other frequency ranges, e.g., "B" and "C," then the positioner 160 identifies the potential location as the general area around the center of zones receiving frequency "A"; if the UE 120 reports relatively equivalent signal strength for two frequency ranges, e.g., "A" and "B," and little or no signal strength for other frequency ranges, e.g., "C," then the positioner 160 identifies the potential location as the general area around the overlap of zones receiving frequency "A" and "B"; and if the UE 120 reports relatively equivalent signal strength for three frequency ranges, e.g., "A," "B," and "C," then the positioner 160 identifies the potential location as the general area around the overlap of zones receiving frequency "A," "B," and "C." Referring to FIG. 4, the zone 434 may receive frequency "A," the zones 442, 444, and 446 may receive frequency "B," and the zones 452, 454, and 456 may receive frequency "C." In some of these scenarios, e.g., where frequency "A" is dominant, the UE 120 can only be in one possible area, i.e., the center region of zone 434. However, in many scenarios the UE 120 could be in three or six possible regions. In some implementation, the positioner 160 identifies regions within which the user equipment 120 might be located. In some implementations, the positioner 160 identifies coordinates for a center of each region, and records these coordinates as a possible location of the user equipment 120. As the HAP 170 moves and the frequency pattern travels, spins, rotates, or is otherwise adjusted on the ground, the positioner 160 can narrow the possibilities. Although the zones are described here as being identified by frequencies, it should be understood that they could alternatively be distinguished by traits other than frequency, e.g., cell identifier, channel marker, or CDMA modulation code. In some implementations, all of the coverage zones use the same frequency or frequency range.

At stage 650, the positioner 160 positions the mobile base station 140 at another location remote from the user equipment location and repeats stage 620. That is, after the HAP 170 has moved, the positioner 160 updates its estimate of the location of the HAP 170 and, the base station 140. The positioner 160 then returns to stage 620 and receives new signal strength information from the user equipment 120 for each of the plurality of frequency ranges.

Stages 620, 630, 640, and 650 are repeated as the high altitude platform 170 moves. Then, when a location is needed for the user equipment 120, the method 600 proceeds to stage 660.

At stage 660, the positioner 160 positions the user equipment 120 at a location based on the identified potential locations from the repeated iterations of stage 640. In some implementations, a process of elimination is used to position the user equipment 120 within a single region consistently identified in stage 640. In some implementations, the positioner 160 records coordinates for a center of each possible regional location of the user equipment 120 within the different zones. A regional location may be an entire zone or a portion of a zone, e.g., a region of particular overlapping zones or a region near such a zone. In some implementations, the coordinates are an estimated location based on the various signal strength magnitudes. In some implementations, the coordinates are an estimated location based on the angle of arrival for signals from the UE 120. A group or cluster of coordinates in close proximity to one another indicates the most likely area for the user equipment 120. In some implementations, the positioner 160 positions the user equipment 120 at coordinates in the middle of such a group or cluster.

In some implementations, UE 120 with known locations, e.g., courtesy of GPS, report those locations to the base station 140. The positioner 160 records signal measurements for these user equipment and creates a dictionary of measurements with known locations. When the positioner 160 attempts to position another UE 120 based on signal measurements, the measurements are compared to entries in the dictionary to improve accuracy. In some such implementations, the dictionary includes information describing position or placement of the pattern 540 at the time of each measurement.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium is tangible and stores data, e.g., computer-executable instructions, in a non-transitory form.

A computer program (also known as a program, software, software application, script, or code) can be written in any form of programming language, including compiled languages, interpreted languages, declarative languages, and procedural languages, and the computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, libraries, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a field programmable gate array ("FPGA") or an application specific integrated circuit ("ASIC"). Such a special purpose circuit may be referred to as a computer processor even if it is not a general-purpose processor.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," an so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be used.

The invention claimed is:

1. A method comprising:
   obtaining identification of a first location for a mobile base station at a first moment in time, wherein the mobile base station is in wireless communication with a user equipment at a remote location from the mobile base station;
   obtaining a first measurement for a characteristic of a first wireless signal transmission between the user equipment and the mobile base station at the first location;
   obtaining identification of a second location for the mobile base station at a second moment in time, the second location different from the first location;
   obtaining a second measurement for the characteristic of a second wireless signal transmission between the user equipment and the mobile base station at the second location; and
   determining the remote location of the user equipment based on the first measurement, the second measurement, the first location of the mobile base station, and the second location of the mobile base station.

2. The method of claim 1, further comprising:
   obtaining measurements for relative signal strengths of multiple signal beams contemporaneously transmitted from the mobile base station to the user equipment; and
   determining the remote location of the user equipment further based on a comparison of the relative signal strengths of the multiple signal beams.

3. The method of claim 1 further comprising:
   obtaining a third measurement for a second characteristic of a third wireless signal transmission between the user equipment and the mobile base station at the first moment in time;
   obtaining a fourth measurement for the second characteristic of a fourth wireless signal transmission between the user equipment and the mobile base station at the second moment in time; and
   determining the remote location of the user equipment based on the first measurement, the second measurement, the third measurement, the fourth measurement, the first location of the mobile base station, and the second location of the mobile base station.

4. The method of claim 1, wherein the mobile base station broadcasts a plurality of different signals in a pattern over a coverage area, the method further comprising:
   obtaining reception characteristics from the user equipment for one or more of the plurality of different signals; and
   positioning the user equipment within the coverage area based on the reception characteristics and the pattern.

5. The method of claim 1, wherein the characteristic is one of: a transmission delay time, a round trip time, or observed time of arrival.

6. The method of claim 1, further comprising:
   storing the first measurement and the second measurement in a computer-readable memory;
   storing, in the computer-readable memory, additional measurements for the first characteristic of other wireless signal transmissions between the mobile base station and a plurality of additional user equipment;
   storing, in association with at least one additional measurement, a respective location of a corresponding user equipment; and
   comparing the first measurement, second measurement, and the at least additional measurement.

7. The method of claim 1, the method further comprising:
   correlating the first measurement to similar measurements for other user equipment with known locations; and
   positioning the user equipment based on a correlation to another user equipment with a known location.

8. The method of claim 1, further comprising
   obtaining a third measurement for the characteristic of a third wireless signal transmission between the user equipment and a fixed-location base station, wherein the fixed-location base station is at a third location; and
   determining the remote location of the user equipment based on the first measurement, the second measurement, the third measurement, the first location of the mobile base station, the second location of the mobile base station, and the third location of the fixed-location base station.

9. A system comprising:
   a positioner comprising a computer-readable memory and at least one computing processor, the computing processor configured to:
      obtain identification of a first location for a mobile base station at a first moment in time, wherein the mobile base station is in wireless communication with a user equipment at a remote location from the mobile base station;
      obtain a first measurement for a characteristic of a first wireless signal transmission between the user equipment and the mobile base station at the first location;
      obtain identification of a second location for the mobile base station at a second moment in time, the second location different from the first location;
      obtain a second measurement for the characteristic of a second wireless signal transmission between the user equipment and the mobile base station at the second location; and
      determine the remote location of the user equipment based on the first measurement, the second measurement, the first location of the mobile base station, and the second location of the mobile base station.

10. The system of claim 9, the computing processor further configured to:
    obtain measurements for relative signal strengths of multiple signal beams contemporaneously transmitted from the mobile base station to the user equipment; and
    determine the remote location of the user equipment further based on a comparison of the relative signal strengths of the multiple signal beams.

11. The system of claim 9, the computing processor further configured to:
    obtain a third measurement for a second characteristic of a third wireless signal transmission between the user equipment and the mobile base station at the first moment in time;
    obtain a fourth measurement for the second characteristic of a fourth wireless signal transmission between the user equipment and the mobile base station at the second moment in time; and
    determine the remote location of the user equipment based on the first measurement, the second measurement, the third measurement, the fourth measurement, the first location of the mobile base station, and the second location of the mobile base station.

12. The system of claim 9, wherein the mobile base station broadcasts a plurality of different signals in a pattern over a coverage area, the computing processor further configured to:

obtain reception characteristics from the user equipment for one or more of the plurality of different signals; and position the user equipment within the coverage area based on the reception characteristics and the pattern.

13. The system of claim 9, wherein the characteristic is one of: a transmission delay time, a round trip time, or observed time of arrival.

14. The system of claim 9, the computing processor further configured to:

store, in the computer-readable memory, additional measurements for the first characteristic of other wireless signal transmissions between the mobile base station and a plurality of additional user equipment;

store, in association with at least one additional measurement, a respective location of a corresponding user equipment; and compare the first measurement, second measurement, and the at least additional measurement.

15. The system of claim 9, the computing processor further configured to:

obtain a third measurement for the characteristic of a third wireless signal transmission between the user equipment and a fixed-location base station, wherein the fixed-location base station is at a third location; and determine the remote location of the user equipment based on the first measurement, the second measurement, the third measurement, the first location of the mobile base station, the second location of the mobile base station, and the third location of the fixed-location base station.

16. A computer-readable memory storing non-transitory computer-executable instructions that, when executed by a computing processor, cause the computing processor to:

obtain identification of a first location for a mobile base station at a first moment in time, wherein the mobile base station is in wireless communication with a user equipment at a remote location from the mobile base station;

obtain a first measurement for a characteristic of a first wireless signal transmission between the user equipment and the mobile base station at the first location;

obtain identification of a second location for the mobile base station at a second moment in time, the second location different from the first location;

obtain a second measurement for the characteristic of a second wireless signal transmission between the user equipment and the mobile base station at the second location; and determine the remote location of the user equipment based on the first measurement, the second measurement, the first location of the mobile base station, and the second location of the mobile base station.

17. The computer-readable memory of claim 16, the instructions further causing the computing processor to:

obtain measurements for relative signal strengths of multiple signal beams contemporaneously transmitted from the mobile base station to the user equipment; and determine the remote location of the user equipment further based on a comparison of the relative signal strengths of the multiple signal beams.

18. The computer-readable memory of claim 16, the instructions further causing the computing processor to:

obtain a third measurement for a second characteristic of a third wireless signal transmission between the user equipment and the mobile base station at the first moment in time;

obtain a fourth measurement for the second characteristic of a fourth wireless signal transmission between the user equipment and the mobile base station at the second moment in time; and determine the remote location of the user equipment based on the first measurement, the second measurement, the third measurement, the fourth measurement, the first location of the mobile base station, and the second location of the mobile base station.

19. The computer-readable memory of claim 16, the instructions further causing the computing processor to:

obtain reception characteristics from the user equipment for one or more of the plurality of different signals; and position the user equipment within the coverage area based on the reception characteristics and the pattern.

20. The computer-readable memory of claim 16, the instructions further causing the computing processor to:

store, in the computer-readable memory, additional measurements for the first characteristic of other wireless signal transmissions between the mobile base station and a plurality of additional user equipment;

store, in association with at least one additional measurement, a respective location of a corresponding user equipment; and compare the first measurement, second measurement, and the at least additional measurement.

\* \* \* \* \*